United States Patent

[11] 3,580,987

[72] Inventor Paolo Gazzana Priaroggia
 Milan, Italy
[21] Appl. No. 808,240
[22] Filed Mar. 18, 1969
[45] Patented May 25, 1971
[73] Assignee Pirelli Societa per Azioni
 Milan, Italy
[32] Priority Mar. 26, 1968, Dec. 23, 1968
[33] Italy
[31] 14832A and 25510A

[54] ELECTRIC CABLE
 9 Claims, 1 Drawing Fig.
[52] U.S. Cl. ................................................ 174/120,
 117/218, 117/232, 174/110
[51] Int. Cl. ................................................ H01b 7/02
[50] Field of Search ........................................ 174/102.2,
 110.44, 120, 120.2, 120.4, 110; 117/218, 232

[56] References Cited
UNITED STATES PATENTS

| | | | |
|---|---|---|---|
| 3,206,542 | 9/1965 | Dawson | 174/110X |
| 3,269,862 | 8/1966 | Lanza | 117/218 |
| 3,312,573 | 4/1967 | Sheffer | 117/218 |
| 3,408,867 | 11/1968 | Henricks | 174/120X |
| 3,422,215 | 1/1969 | Humes | 174/120 |
| 3,433,891 | 3/1969 | Zysk | 174/120 |

Primary Examiner—E. A. Goldberg
Attorney—Ward, McElhannon, Brooks & Fitzpatrick

ABSTRACT: Electric cable and process for its manufacture are disclosed. The electric cable has its electric conductor covered with extruded insulation comprising numerous layers of insulating material, the number of such layers being more than two and preferably ranging between 5 and 100, and the thickness of each of such layers being not greater than 2 mm. and preferably ranging between 0.2 and 2 mm.

Patented May 25, 1971 3,580,987
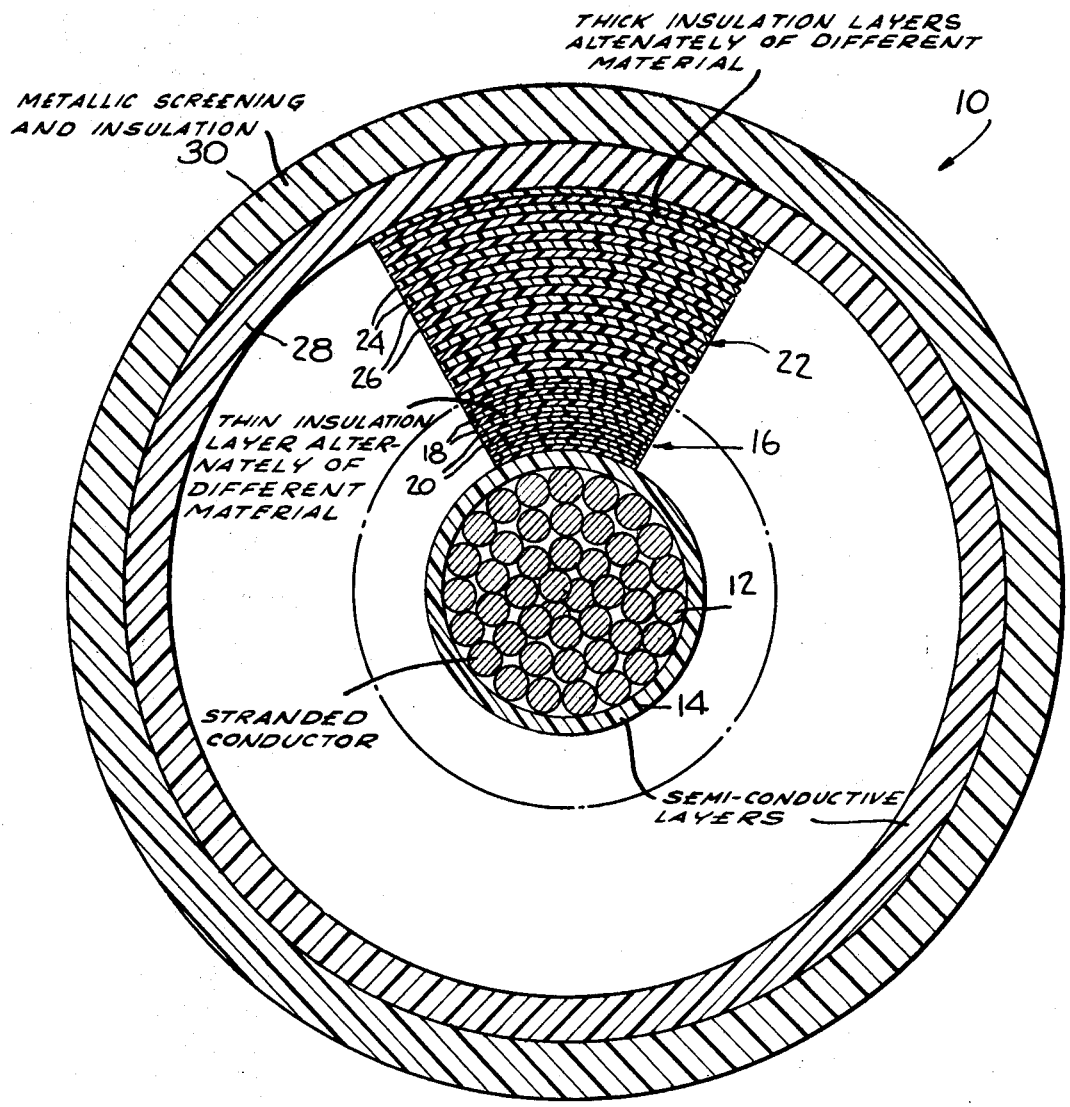
INVENTOR.
PAOLO GAZZANA PRIAROGGIA
BY
ATTORNEYS

ELECTRIC CABLE

This invention relates to an electric cable having insulation comprising numerous layers of insulating material, such as rubber or synthetic insulating material, and also to manufacturing processes for making such cable.

In the present invention, the term "insulating material" is used to mean any material capable of being extruded and covering the core of an electric cable so as to form its insulation. This definition will include, therefore, the various known insulating rubber materials and the various known insulating synthetic materials, such as for example, polyethylene.

Electric cables having a layer of insulating material applied thereto by passing the conductor thereof through an extrusion head, are known. These known cables have, however, at least two major structural defects. One structural defect is caused by the presence of impurities in the insulation of the cable. Such impurities, usually arising from the batch of insulating material or from the extruding device itself, may be oriented in the insulation of the cable so as to give rise to considerable deterioration of the electric properties of the cable. For example, impurities of elongated shape, such as filiform foreign bodies, are particularly harmful, since they, when oriented transversely with respect to the cable core, can constitute points of low resistance to the passage of an electric discharge between the cable core and the outside, and can seriously reduce the effective thickness of the insulation at these points.

Another structural defect of known cables of the character described, especially if the insulation thereof is made of polyethylene, is caused by an uneven cooling in their thick extruded insulation after the extrusion process is carried out. Such uneven cooling usually creates internal stresses in the extruded insulation which may result in residual tensions and deformations in the finished cable causing irregularities in the shape of the electric cable.

Electric cables covered with an insulation comprising several layers, usually two or three layers of different insulating materials, are also known. However, the respective layers of such cables are always of a thickness which gives rise to both of the above mentioned structural defects.

In accordance with the present invention, there is provided an electric cable in which any impurities therein are oriented so that their harmful effect is substantially reduced, which has no substantial internal stresses causing distortion of the shape thereof, and which has unexpected improved electrical characteristics with respect to conventional cables insulated with the same material.

According to one aspect of the present invention, there is provided an electric cable having insulation comprising numerous layers of insulating material, the number of such layers being larger than two and preferably ranging between five and 100, and the thickness of each of such layers being not greater than 2 mm. and preferably ranging between 0.2 and 2 mm.

By virtue of the small thickness of the individual layers, any impurities in the individual layers are compelled to orient parallel to such insulating layers, whereby their above stated prejudicial effect on the cable insulation is considerably reduced. Also, because the thickness of the individual layers is small, there is less tendency for uneven cooling thereof and thus for the creation of the above discussed serious internal stresses.

According to another aspect of the present invention there is provided a process for the manufacture of such electric cable wherein the cable core is covered with numerous layers of insulating material which number more than two and preferably range between five and 100, and which have a thickness no greater than 2 mm. and preferably range between 0.2 and 2 mm., and wherein each individual layer of the insulation is extruded at a predetermined distance from the point of extrusion of the preceding layer thereof.

The cable according to the present invention can be manufactured with known cable insulation extruding devices, either by sequentially passing the cable conductor or core through a plurality of extrusion heads, or by passing it through a multiple-head extruder which applies two or more layers to the conductor during a single passage.

The thickness of each of the individual layers may be the same throughout the whole insulation, or the various layers thereof may have different thicknesses. In one preferred form, for example, the outer layers of the insulation have a greater thickness than the inner layers thereof. Also, the various layers making up the cable insulation may be made of different materials. It is preferable, however, to use only two materials and to alternate their use such that each layer of one material is adjacent to two layers of the other material, excepting, of course, the innermost and the outermost layers thereof. The combination of materials making up the various layers should be selected so that the various layers in the finished cable adhere to one another without creating any air pockets therebetween. Examples of such combinations of appropriate materials are: low density polyethylene and high density polyethylene; low melt-index polyethylene and high melt-index polyethylene; polyethylene and polypropylene; cross-linked ethylene-propylene and cross-linked polyethylene; EPD terpolymer and cross-linked polyethylene.

The various layers of the cable in accordance with the present invention may also be made of the same material and in the same manner as described above. Since the layers of the cable constructed in accordance with the present invention are extruded at certain distances from one another, the individual layers, before being covered with subsequent ones, lie and settle in a certain position so that their individuality as layers is maintained notwithstanding that all the layers are made of the same material.

It should be noted that, irrespectively of the solution of the cited structural defects found in prior art cables of the character described, the cable of the present invention shows improved and absolutely unexpected electrical characteristics with respect to prior art cables insulated with the same materials as those of the present invention. The noted improved electrical characteristics are especially great when the cable of the present invention is built up by using at least two different types of insulating material and alternating their use so that each layer of one material is adjacent to layers made of material different from the first. Such improvement of the electrical characteristics of the cable of the present invention is especially surprising since apparently it is not due to the partial introduction of the layers of material having high characteristic, but rather is apparently due to the mere presence of different materials. In fact, it has been found that the electrical characteristics of the cable constructed in accordance with the present invention are better than those of a theoretical cable which is completely insulated with an insulating material having the better electrical characteristics among those used in the cable constructed in accordance with the present invention.

The reasons for these noted surprising results cannot at present be explained with certainty, but by way of hypothesis, it is thought that if the conditions for an incipient discharge take place at a certain point in the insulation of the cable constructed in accordance with the present invention, the reduced thickness of the layer containing that point and the fact that such layer is adjacent to the other layers made of different material, cooperate in preventing the propagation of such dangerous disruptive conditions in the whole insulation of the cable. Hence a disruptive discharge, having electric gradients much higher than those which would originate a discharge in a homogeneously insulated cable because of its facility to propagate in the whole thickness of the insulation, is avoided.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as the basis for the designing of other structures for carrying out the several aspects of the invention.

Certain specific applications of the invention have been chosen for purposes of illustration, and one of which is shown in the accompanying drawings forming a part of the specification, wherein the single FIGURE thereof shows a cross section view of a cable constructed in accordance with the present invention for use in a 132 kv. three-phase electrical system.

As shown in the drawings, a cable 10 constructed in accordance with the present invention for use in a 132 kv. three-phase electrical system, includes a compact stranded conductor 12 which is made of tin-plated copper and has a cross section of 120 mm.² and a diameter of 13 mm. The conductor 12 is covered with a layer 14 of semiconductive polyethylene, which brings the overall diameter of the cable assembly up to 15 mm. at this point. According to the present invention, the insulation for the conductor 12 includes a first group 16 of layers comprising layers 18 of low-density polyethylene alternated with layers 20 of high-density polyethylene, both of which are applied over the semiconductive layer 14. More particularly, the layers 18 are made of L.D. DFD 6603 polyethylene (Union Carbide), and the layers 20 are made of H.D. Hostalen GF 5250 polyethylene (Hoechst).

The insulation of a cable 10 also includes a second group 22 of layers comprising layers 24 of low-density polyethylene alternated with layers 26 of high density polyethylene. Preferably, the layers 24 and 26 of the second group 22 of the insulation are made of the same above-mentioned specific insulating materials which layers 18 and 20 of the first group 16 are made. Also, the layers 18 and 20 of the first group 16 have a thickness of 0.2 mm. and are built on one another up to a diameter of 22.6 mm; and layers 24 and 26 of the second group 22 have a thickness of 0.5 mm. and are built on one another to a diameter of 43.6 mm.

A second layer 28 of semiconductive polyethylene is applied around the second group 22 so that the diameter of the cable assembly at this point is brought up to 48.1 mm. The cable is then completed with a metallic screening 30 comprising an outer layer of copper wires and a polyethylene sheath. The total diameter of the cable is 53.7 mm.

The cable shown in the drawings may be modified for use in a 220 kv. three-phase electric system. In this case, the structure and materials of the cable are substantially the same as those of the embodiment shown in the drawings, but have different dimensions. Thus, in this embodiment, the conductor 12 is a 240 mm.² strand conductor which has a diameter of 18.75 mm. and which is covered with a semiconductive layer 14 bringing the diameter of the cable at this point up to 20.75 mm. Alternating insulating layers 18 and 20 of 0.2 mm. thickness are applied over the semiconductive layer 14 up to a diameter of 31.15 mm. and alternating insulating layers 24 and 26 of 0.5 mm. thickness are then applied thereover to bring the cable to a diameter of 73.15 mm. The cable is then completed by applying the outer semiconductive layer 28 and metallic screening 30. The outer semiconductive layer 28 brings the diameter of the cable at that point up to 76.15 mm. and the outer sheath 30, which may comprise metallic screening and sheath lead, brings the cable up to a final diameter of 85.65 mm.

The above-described numerous layers may be built up by passing the conductors thereof through a plurality of extruders, each of which applies an individual layer of insulation. More conveniently, however, such cables can be manufactured by passing the conductors thereof through a lesser number of extruders, each of which is, however, provided with a known multiple head and thus applies a group of layers.

It will thus be appreciated from the above, that in addition to reducing the structural defects attendant the presence of impurities and internal stresses in the cable insulation, cables constructed in accordance with the present invention are capable of translating service voltages far higher than those carried at the present time in cables insulated with rubber or synthetic material.

I claim:

1. An electric cable comprising a stranded electric conductor covered with electrical insulation, said electrical insulation comprising unitary, reentrant and concentric layers of electric insulating material extruded over said stranded conductor in the form of successive, individual tubes which are continuous lengthwise of the cable, the layers being settled at different positions with their individuality as layers maintained, the number of said layers being more than two, and the thickness of each of said layers being not greater than 2 mm. and at least 0.2 mm.

2. An electric cable as in claim 1 wherein all of said layers of insulating material are substantially the same thickness.

3. An electric cable as in claim 1 wherein a plurality of the innermost of said layers of insulating material are thinner than the outermost layers thereof.

4. An electric cable as in claim 1 wherein all of said layers of insulating material are made of the same insulating material.

5. An electric cable as in claim 1 wherein predetermined ones of said layers of insulating material are made of insulating material different from the insulating material of others of said layers and wherein said predetermined ones of said layers are interposed between said other layers.

6. An electric cable as in claim 5 wherein said layers of insulating material are made of two different insulating materials.

7. An electric cable as in claim 6 wherein said two insulating materials are low melt-index polyethylene and high melt-index polyethylene, respectively.

8. An electric cable as in claim 1 wherein the number of said layers is between five and 100.

9. In an electric cable having electric conductor means covered with electrical insulation, the improvement wherein said electrical insulation comprises layers of electric insulating material, the number of said layers being more than two, the thickness of each of said layers being in the range from about 0.2 to 2 mm. and at least one of the layers being made of a first synthetic resin and at least one other of said layers being made of a second synthetic resin, the pair of said first and second resins being selected from the group consisting of low-density polyethylene and high-density polyethylene, polyethylene and propylene, cross-linked ethylene-propylene and cross-linked polyethylene, EPD terpolymer and ethylene-propylene and EPD terpolymer and cross-linked polyethylene.

UNITED STATES PATENT OFFICE
CERTIFICATE OF CORRECTION

Patent No. 3,580,987          Dated May 25, 1971

Inventor(s) Paolo Gazzana Priaroggia

It is certified that error appears in the above-identified patent and that said Letters Patent are hereby corrected as shown below:

Column 2, line 21, after "polyethylene;" insert -- EDP terpolymer and ethylene-propylene; and --. Column 4, line 42, beginning with "7. An electric" cancel all to and including "respectively." in line 44, same column 4. On the cover sheet, "9 Claims." should read -- 8 Claims. --.

Signed and sealed this 7th day of December 1971.

(SEAL)
Attest:

EDWARD M. FLETCHER, JR.
Attesting Officer

ROBERT GOTTSCHALK
Acting Commissioner of Patents